Oct. 21, 1958 — M. SMOLENSKY — 2,856,956
PNEUMATIC CHECK VALVE
Filed Nov. 22, 1954

INVENTOR.
MICHAEL SMOLENSKY
BY Golrick & Golrick
ATTORNEYS

United States Patent Office 2,856,956
Patented Oct. 21, 1958

2,856,956

PNEUMATIC CHECK VALVE

Michael Smolensky, Cleveland Heights, Ohio

Application November 22, 1954, Serial No. 470,153

1 Claim. (Cl. 137—512.1)

This invention is concerned with pneumatic check valves and has for its general object the provision of a sensitive heavy duty check valve mechanism which can be incorporated in pneumatic lines.

More specifically the invention is directed to a pneumatic check valve structure wherein the check valve means will have pressure areas which in total exceed the cross sectional or flow area of the conduit in which the check is to be effected.

The construction is such that the valving members can be pre-assembled on an insert structure adapted to be fitted into the inlet end of a valve body thereby to enhance the convenience of manufacture and to facilitate servicing of the operating parts of the valve mechanism.

Other objects of invention will become apparent to those skilled in the art from the following description which refers to the accompanying drawings showing a preferred form thereof. The essential characteristics are summarized in the claim.

Figure 1:
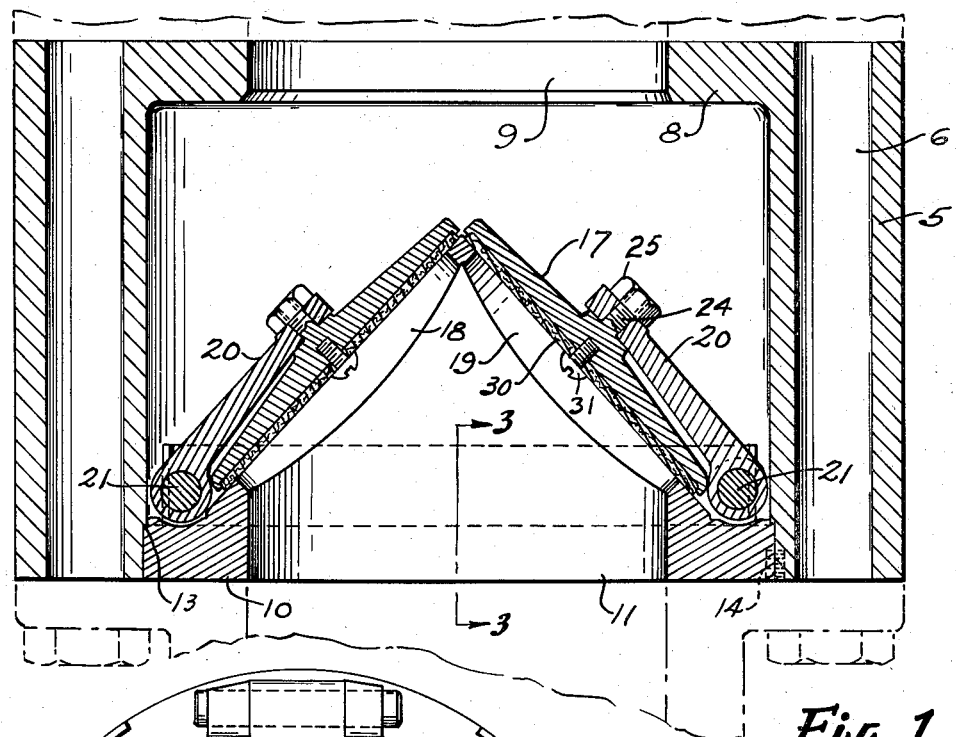
Fig. 1 is a central cross section taken through an annular valve body containing the valve mechanism.
Figure 2:
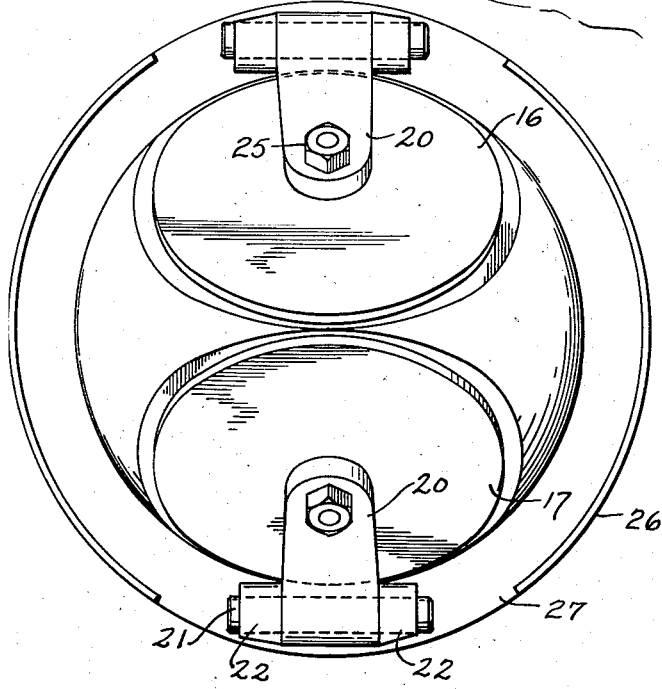
Fig. 2 is a view in plan from the downstream end of the insert assembly.
Figure 3:
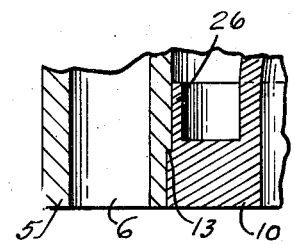
Fig. 3 is a fragmentary section taken at 3—3 in Fig. 1.

My invention contemplates the use of a plurality of valve ports the combined flow area of which exceeds the cross-sectional or flow area of the pneumatic line being served by the valve mechanism. In the structure disclosed I arrange two valve seats in converging planes extending in a down stream direction and the sum of the flow areas of the ports of the seats exceeds the area of the inlet port of the mechanism. The valve members for closing these ports are pressure and gravity operated without the presence of actuating springs.

Referring to the drawings I show a valve body 5 which is substantially annular in construction with cored bolt holes 6 extending from end to end to afford securement of the valve body to the flanged ends of adjacent section A and B of a pneumatic pipe line. The valve body has an outlet end wall 8 provided with an outlet 9 having a flow area substantially equal to that of the pipe line.

The movable elements of the mechanism comprise two swingable valve members 16 and 17 adapted to seat upon ported valve seat structures 18 and 19 integrally formed as part of the insert structure 10. The insert structure 10 includes a shouldered integral cylindrical base fitted into the inlet end of the valve body 5 against a stop shoulder 13 defining the position of the insert relative to the interior of the valve body. Screw members 14 lock the insert in place. An inlet opening 11 is formed in the insert of about the same area as the outlet opening 9 and in alignment therewith. The upper part of the insert may be considered as roughly a hollow semi-spherical dome with spherical segments removed at opposite sides to provide the insert ports. The valve seats 18 and 19 are here flat peripheral areas about the fluid flow openings or ports 18a, 19a of the insert, that is the valve seat areas lie in planes forming a dihedral angle whereof the dihedral edge is at the downstream end of the insert.

The swinging valve members 16 and 17 are pivotally supported on arms 20 and the arms are swingably supported on pins 21, the pins being supported between lugs 22 formed on the insert structure. The pins 22 are disposed substantially parallel, and the centers of the arms and valve members swing in areas coplanar with the valve axis and with each other. In the form shown, the plane of swing of the arm center lines and valve member centers is perpendicular to the aforementioned dihedral edge and through the centers of the insert ports.

The valve members 16 and 17 have solid hub portions 24 which loosely fit in openings formed in the outer or upper ends of the valve arms 20 and are held on the arms by nuts 25 threaded to the said hub portions. The valve members 16 and 17 are provided with facing disks 30 formed of a suitable gasket medium and these seating disks bear upon the flat valve seats of the valve structure. Any suitable means such as clamp screws 31 may serve to hold the sealing disks in place.

To facilitate the aligning of the insert a cylindrical extension 26 beyond the insert shoulder may be formed about the perimeter of the insert 10 which may be cut away as indicated at 27 to permit assembly of the pins 21.

It will be noted that the upper portions of the valves 16 and 17 when swung to extreme open position encounter stops comprising the cylindrical wall of the valve body with the center of gravity of the arms and valve members displaced inwardly from the centers of the pins 21 so that a dropping or downward swing of the valve members, upon reduced velocity of the air through the valve body, is assured.

I claim:

In an air check valve mechanism, an annular valve body having a cylindrical internal wall surface with aligned inlet and outlet ends, the inlet end consisting of an insert structure fitted in the inlet end of the body having a semi-spherical shaped valve wall with valve openings therein and an inlet port substantially equal in area to an outlet formed in the outlet end of the body, said semi-spherically shaped valve wall having valve seats formed about the valve openings in planes converging down stream whereby the combined areas of the valve seats on the semi-spherical wall exceed the area of said inlet port, valve members pivotally mounted on the insert and movable toward and away from the seats, pivot pins on the insert supporting the valve members, said insert having a cylindrical shoulder formation below the pivot pins, the insert shoulder engaging a shoulder formed in the cylindrical internal wall surface of the valve body, said insert having a pilot skirt of the same diameter as the diameter of the cylindrical internal wall surface of the valve body, swingable valve supporting arms supported by said pins, said pins being supported by spaced lugs formed within the insert skirt at a position to have the center of gravity of the arms and valve members displaced inwardly of the centers of the pins when the valve members are swung to fully open position whereby the valve members will fall from a substantially vertical position to a closed position upon a sudden drop in pressure in the inflow end of the valve.

References Cited in the file of this patent

UNITED STATES PATENTS

| 831,141 | Cash | Sept. 18, 1906 |
| 1,673,831 | Kuehne | June 19, 1928 |
| 2,068,833 | White | Jan. 26, 1937 |
| 2,157,554 | McFarlin | May 9, 1939 |
| 2,729,238 | Hite | Jan. 3, 1956 |

FOREIGN PATENTS

| 26,783 | Great Britain | of 1909 |
| 1,033 | Holland | of 1916 |